United States Patent [19]

Jaksic

[11] Patent Number: 4,753,325

[45] Date of Patent: Jun. 28, 1988

[54] PARKING BRAKE ASSEMBLY INCLUDING AUTOMATIC LATCHING DEVICE ASSOCIATED WITH BRAKE LEVER AND CABLE, AND METHOD OF CONNECTING CABLE THEREOF

[75] Inventor: Miroslav Jaksic, Toledo, Ohio

[73] Assignee: Babcock Industries Inc., Fairfield, Conn.

[21] Appl. No.: 105,389

[22] Filed: Oct. 5, 1987

[51] Int. Cl.$^4$ .............................................. F16D 51/00
[52] U.S. Cl. ................................ 188/2 D; 29/402.01;
29/402.08; 74/501 R; 188/325; 188/328;
188/106 F; 188/106 A; 188/79.51; 188/112 R
[58] Field of Search .................... 188/2 D, 325–343,
188/79.5, 106 F, 106 A, 361, 382, 112;
29/402.08, 402.01, 402.03; 74/501 R, 89.2;
428/578, 583, 596

[56] References Cited

U.S. PATENT DOCUMENTS

| | | | |
|---|---|---|---|
| 3,064,767 | 11/1962 | Wieger | 188/106 F |
| 3,101,205 | 8/1963 | Benham | 188/2 D |
| 3,661,233 | 5/1972 | Margetts et al. | 188/106 A |
| 3,666,058 | 5/1972 | Quiney | 188/106 A |
| 3,782,507 | 1/1974 | Shreve | 188/2 D |
| 3,828,895 | 8/1974 | Boaz | 188/2 D X |
| 3,871,493 | 3/1975 | Mathias | 188/2 D X |
| 3,999,637 | 12/1976 | Schumacher | 188/106 A |
| 4,076,105 | 2/1978 | Aono | 188/106 A |
| 4,387,792 | 6/1983 | Imamura | 188/106 A X |
| 4,569,112 | 2/1986 | Dussault | 188/2 D X |
| 4,570,761 | 2/1986 | Inoue | 188/106 A X |
| 4,595,084 | 6/1986 | Le Deit | 188/328 |

Primary Examiner—Douglas C. Butler
Attorney, Agent, or Firm—Barnes, Kisselle, Raisch, Choate, Whittemore & Hulbert

[57] ABSTRACT

A parking brake assembly comprising a pair of brake shoes pivotally mounted on a backing plate, a brake operating lever pivoted to the brake shoe and operable by a remote cable for pivoting the brake shoes against a brake drum, and a coil spring provided under compression between the brake lever and the backing plate. During shipment of the parking brake assembly, it is attached to an axle and the coil spring has an end that extends to an opening in the back plate. The cable including a conduit and an inner member, preferably a flexible strand, is handled separately. After the parking brake assembly is attached to an automotive vehicle, the cable can be connected even though the brake drum is in place and prevents seeing the interior of the brake assembly. Specifically, the strand is then forced through the conduit and the coil. The brake lever includes a bracket defining a ramp that guides an enlargement on the end of the strand until the enlargement extends beyond the band and then snaps laterally behind the bracket to provide engagement between the strand and the bracket and in turn the brake lever. The conduit of the cable which surrounds the strand is then connected to the backing plate by a connector on the conduit.

13 Claims, 3 Drawing Sheets

FIG.2
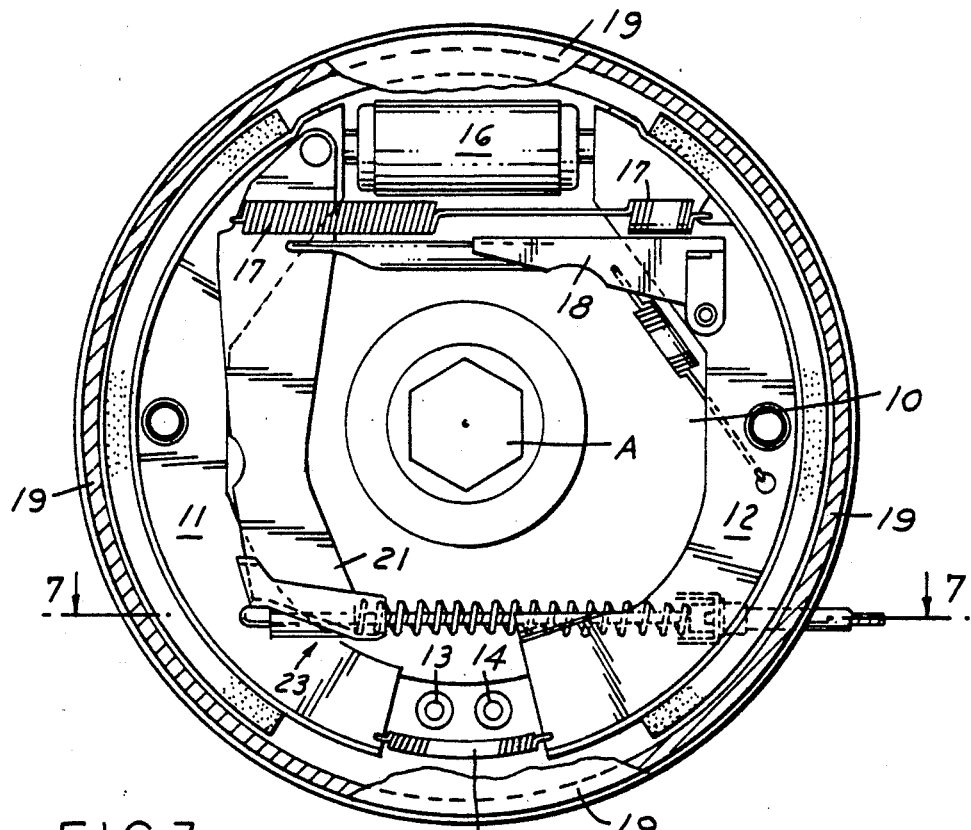
FIG.3
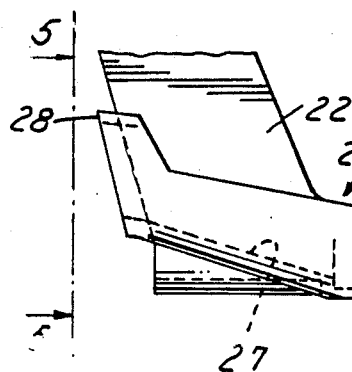
FIG.4  FIG.5
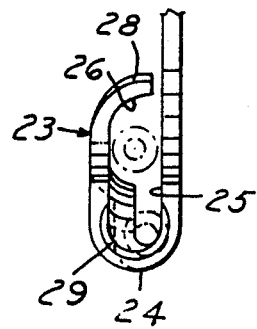 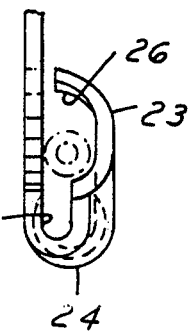
FIG.6
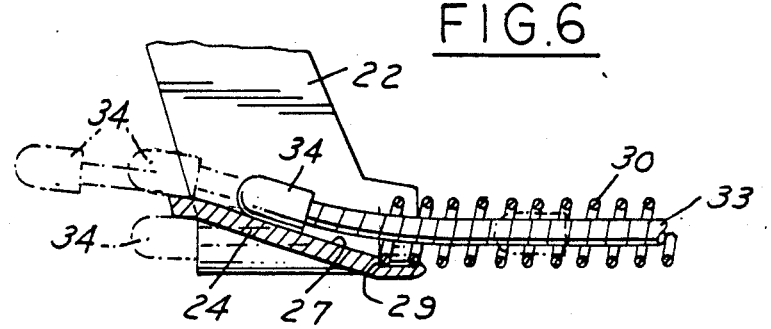

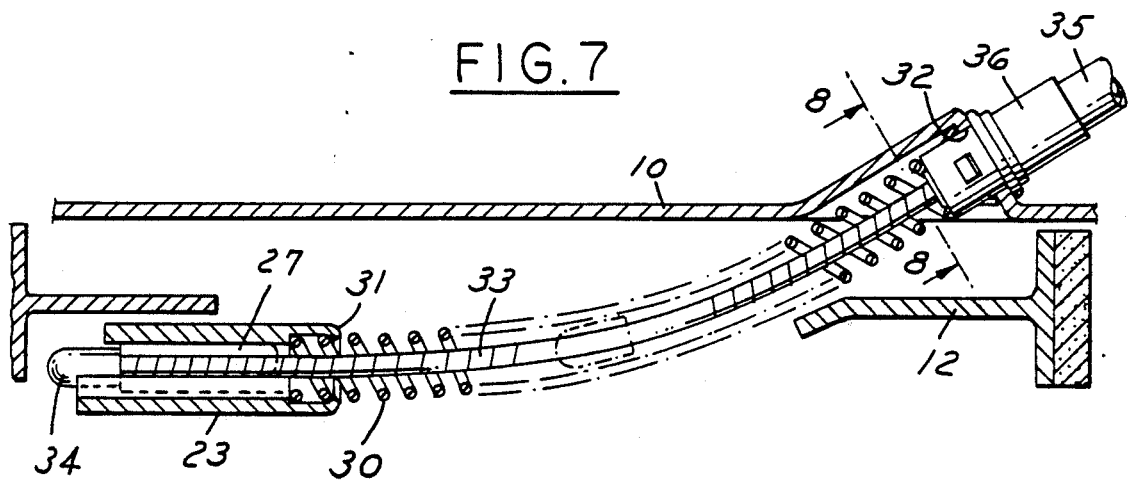
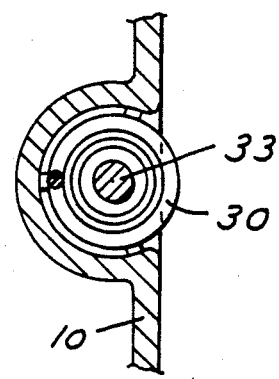
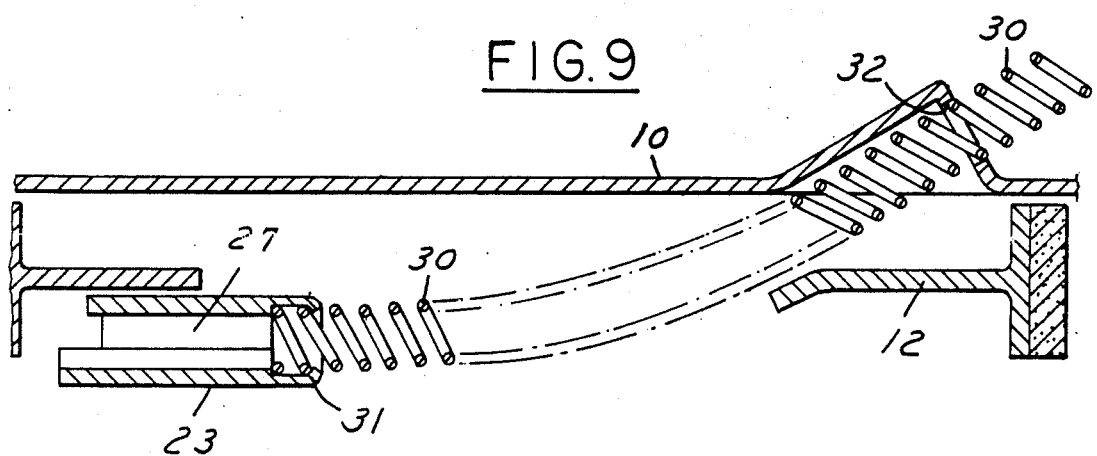

4,753,325

PARKING BRAKE ASSEMBLY INCLUDING AUTOMATIC LATCHING DEVICE ASSOCIATED WITH BRAKE LEVER AND CABLE, AND METHOD OF CONNECTING CABLE THEREOF

This invention relates to parking brake assemblies and particularly to the problem of connecting parking brake assemblies in an automotive vehicle.

BACKGROUND AND SUMMARY OF THE INVENTION

In automotive vehicles, it is common to provide a parking brake assembly associated with each of the rear wheels wherein the assembly includes a brake backing plate, a pair of brake shoes pivoted to the backing plate and operated by a brake piston and a brake lever pivoted to one brake shoe then operatively connected by the strand through a conduit to a remote parking brake actuator. Due to the difficulty of assembling the cable when a brake drum is in place, it has been the practice to connect the cable before the brake drum is placed in position. The conduit of the cable is connected to the backing plate and the inner member, such as a flexible strand, is engaged with the braking lever by engaging an enlargement on the end of the strand on a hook on the braking lever. Inasmuch as the cable is relatively long for extending to the brake actuator, it is then necessary to wrap the cable about the associated axle on which the brake assembly is mounted and then unwrap the cable at the ultimate destination where the axle is assembled to the vehicle. Such a wrapping and unwrapping can damage the cable or possibly cause injury to a worker as the cable uncoils from its wrapped position.

Among the objectives of the present invention are to provide a parking brake assembly wherein the cable can be connected after the parking brake assembly including the brake drum is placed in position on the automotive vehicle; which does not require the worker assembling the vehicle to be able to see the interior of the brake assembly; which is relatively inexpensive; and which can be effectively and easily connected to the cable after the brake assembly is assembled to the vehicle.

In accordance with the invention, the parking brake assembly comprises a pair of brake shoes pivotally mounted on a backing plate, a brake operating lever pivoted to the brake shoe and operable by a remote cable for pivoting the brake shoes against a brake drum, and a coil spring provided under compression between the brake lever and the backing plate. During shipment of the parking brake assembly, it is attached to an axle and the coil spring has an end that extends to an opening in the back plate. The cable including a conduit and an inner member, preferably a flexible strand, is handled separately. After the parking brake assembly is attached to an automotive vehicle, the cable can be connected even though the brake drum is in place and prevents seeing the interior of the brake assembly. Specifically, the strand is then forced through the conduit and the coil. The brake lever includes a bracket defining a ramp that guides an enlargement on the end of the strand until the enlargement extends beyond the band and then snaps laterally behind the bracket to provide engagement between the strand and the bracket and in turn the brake lever. The conduit of the cable which surrounds the strand is then connected to the backing plate by a connector on the conduit.

DESCRIPTION OF THE DRAWINGS

FIG. 2 is a fragmentary front elevational view of a parking brake system embodying the invention.

FIG. 3 is a fragmentary elevational view on an enlarged scale of a portion of the system shown in FIG. 2.

FIG. 4 is a fragmentary view taken along the line 4—4 in FIG. 3.

FIG. 5 is a fragmentary view taken along the line 5—5 in FIG. 3.

FIG. 6 is a fragmentary elevational part sectional view showing the assembly of the cable to the parking brake assembly.

FIG. 7 is a fragmentary sectional view taken along the line 7—7 in FIG. 2.

FIG. 8 is a fragmentary sectional view taken along the line 8—8 in FIG. 7.

FIG. 9 is a fragmentary view showing the relative positions of the parts prior to assembly of a cable.

DESCRIPTION

Figure 1:
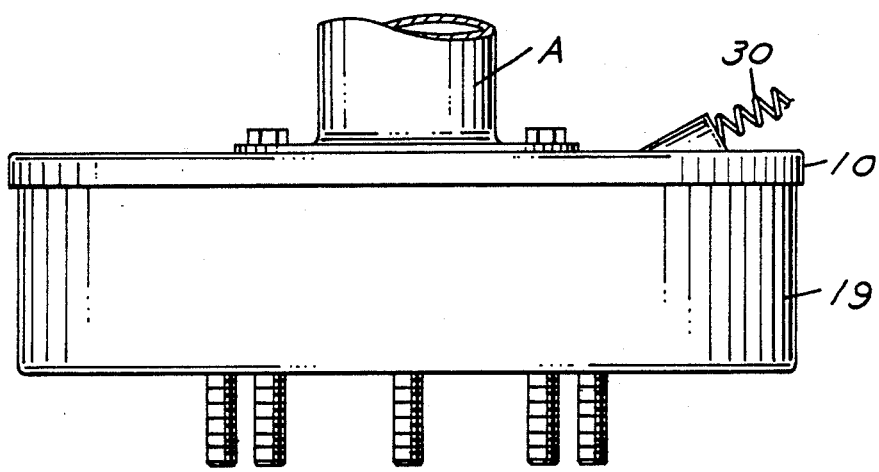
FIG. 1 is a side elevational view of a parking brake system embodying the invention.

Referring to FIGS. 1 and 2, the parking brake assembly is shown as applied to a conventional brake assembly which includes a braking plate 10 on which brake shoes 11, 12 are pivoted at one end 13, 14 and interconnected by a tension spring 15 and a brake cylinder 16 is interposed between the other ends for actuating the brake shoes. A tension spring 17 interconnects the other ends of the brake levers and a self-adjusting mechanism 18 in interposed between the brake shoes for adjusting clearance relative to the drum 19 which covers the brake assembly. The backing plate is mounted on an axle A. This arrangement is generally old and well known in the art.

Further, it has been known to provide a parking brake operating lever 21 which is pivoted to one end of one of the shoes, for example shoe 11, and connected by a cable including a conduit and a flexible strand to a remote actuator such as a foot pedal or a hand-operated lever.

Because of the difficulties of connecting the cable to the brake assembly after the drum 19 is in position, it has been common to make the connection to the brake lever 21 at the plate of manufacture of the brake assemblies when they are mounted on the axle such as the rear axle of a vehicle and before the drum is in place. Inasmuch as the cable is relatively long for extending to the brake actuator, it is then necessary to wrap the cable about the associated axle on which the brake assembly is mounted and then unwrap the cable at the ultimate destination where the axle is assembled to the vehicle. Such a wrapping and unwrapping can damage the cable or possibly cause injury to a working as the cable uncoils from its wrapped position.

In accordance with the invention, the lower end 22 of the brake operating lever 21 is formed with a wall 23 connected by a curved portion 24 and extending parallel to the main portion of the lever 21 to define a vertical slot 25 and an upper enlarged space 26. The portion 24 extends upwardly and to the left as viewed in FIG. 2 to define a ramp 22. The wall 23 further includes a portion 28 that extends in overlying relationship to a portion if the ramp.

The wall 24 further includes an annular shoulder 29 at its other end which is engaged by a coil spring 30. After the coil spring 30 is placed in position a portion 31 is crimped about the end of the spring 30 to hold it in position. The other end of the coil spring 30 extends through an opening 32 in the backing plate 10 during shipment (FIG. 9).

When the parking brake assembly and the axle on which it is mounted are delivered to the automotive vehicle assembly plant and the axle is attached to the vehicle, the inner member, preferably a flexbile strand 33, of a cable is then threaded through the coil spring 30 and an enlargement 34 on the end of the strand 33 engages and is guided by ramp 27 (FIG. 6) until the enlargement 34 passes the end of the ramp 27 and the natural elasticity of the strand 33 causes the enlargement 34 to snap behind the lower portion 24 so that the strand 33 extends into the narrow slot 25. The portion 28 functions to prevent inadvertent upward movement of the flexible strand 33 during the assembly. It may be noted that the curvature of the brake drum which will be in position at this time functions to insure the movement of the flexible strand 33 upwardly and to the left as viewed in FIG. 5. The conduit 35 of the cable is then connected to the backing plate 10 by a snap type connector 36. Connector 36 may be of any well known construction as shown, for example, in U.S. Pat. Nos. 2,869,905 and 4,324,503, which are incorporated herein by reference. During the attachment, spring 30 becomes compressed between the shoulder 29 and the connector 36.

It can thus be seen that there has been provided a brake spring assembly which does not require the cable to be connected to the brake at the time of assembly on the axle and the cable can be connected at the automotive vehicle plane while the brake drum is in place and prevents viewing the interior of the brake assembly without the use of tools and without manual intervention into the brake area; and which will function effectively.

Figure 10:
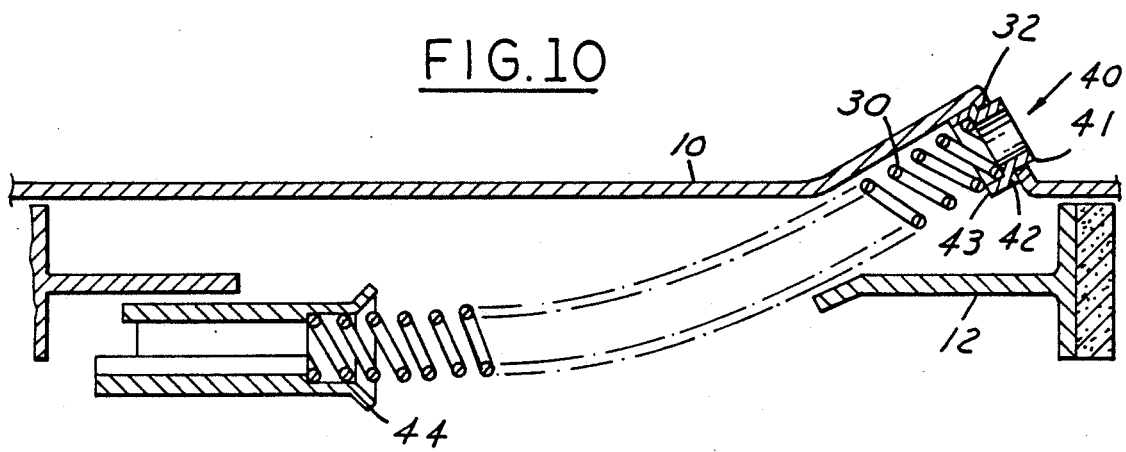
FIG. 10 is a fragmentary sectional view similar to FIG. 9 of a modified form of the invention.
Figure 11:
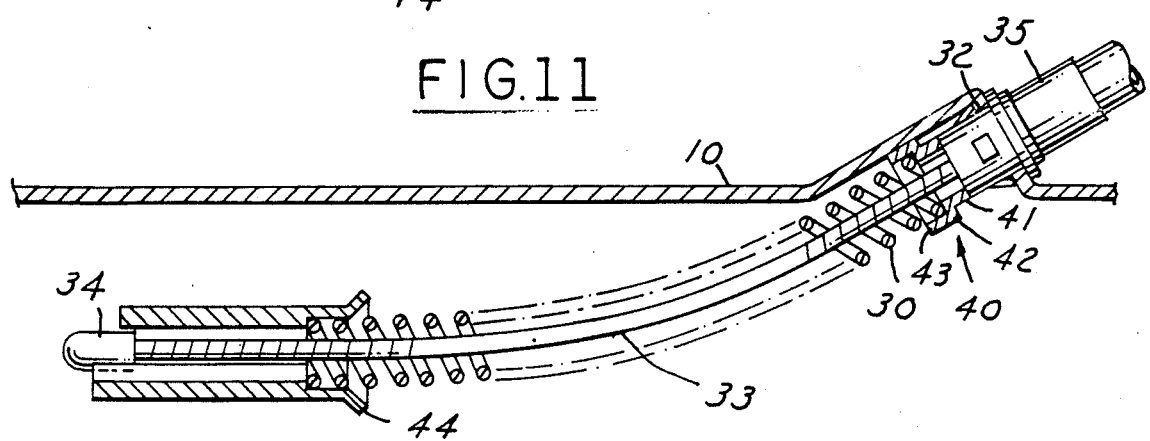
FIG. 11 is a fragmentary sectional view of the modified form shown in FIG. 10 after assembly of the cable.

In the modified form of assembly shown in FIGS. 10 and 11, the brake assembly is substantially the same as that previously described except that spring 30 is provided with a member 40 that engages opening 32 so that spring 30 is precompressed during shipment. More specifically, member 40 includes a tubular portion 41 that projects through opening 32 and a flange portion 42 that engages the interior of the wall of backing plate 10 through which spring 32 extends. Member 40 also includes a wall 43 engaging the end of spring 30. If desired, wall 24 can be provided with an outwardly extending lip 44 for guiding the other end of spring 30 during assembly in the brake assembly.

During shipment of the axle and brake assembly, the brake assembly is in the condition shown in FIG. 10 with the brake drum in place. After the axle has been assembled to the vehicle, the strand 33 is threaded through the coil 30 and engages in the same manner as in the previously described form. Connector 36 on conduit 35 is then connected to the backing plate. During this connection, connector 35 moves member 40 as shown in FIG. 11 further compressing spring 30.

I claim:
1. A parking brake assembly comprising
   a backing plate,
   a pair of brake shoes pivotally mounted on said backing plate,
   a brake operating lever operatively connected to one of the brake shoes and operable by a remote cable including a conduit and an inner member for pivoting the brake shoe,
   a brake drum adjacent the brake shoes, the lever located totally within the space between said backing plate and brake drum,
   a guide means having one end associated with the brake operating lever and extending adjacent an opening in the backing plate,
   automatic latching means on the brake operating lever adjacent said one end of said guide means,
   such that the parking brake assembly can be attached to an axle and shipped with the axle to a vehicle assembly plant and thereafter a cable can be attached by threading the inner member of the cable through the guide means into engagement with the automatic latching means to latch the inner member to the brake operating lever while the brake drum is in position adjacent the brake shoes.

2. The parking brake assembly set forth in claim 1 wherein said guiding means comprises a coil spring.

3. The parking brake assembly set forth in claim 2 wherein said coil spring has its other end extending adjacent an opening in the backing plate.

4. The parking brake assembly set forth in claim 2 wherein said coil spring is compressed between the brake operating lever and the backing plate.

5. The parking brake assembly set forth in claim 4 including a member interposed between the other end of said coil spring and said opening in said backing plate.

6. The parking brake assembly set forth in claim 1 wherein said automatic latching means comprises a bracket including an inclined ramp, a slot at the end of the ramp and inner member comprises a flexible strand such that an enlargement on the end of the flexible strand will be guided by the ramp until the enlargement passes the ramp after which the inherent elasticity of the flexible strand causes the strand to pass through the slot and lock into engagement with the brake operating lever.

7. The parking brake assembly set forth in claim 6 wherein said bracket is U shaped including an intermediate portion defining said ramp.

8. The parking brake assembly set forth in claim 7 including a lip overlying said ramp for preventing inadvertent movement of the flexible strand out of engagement with the ramp.

9. The parking brake assembly set forth in claim 2 wherein said automatic latching means comprises a bracket including an inclined ramp, a slot at the end of the ramp and the inner member comprising a flexible strand such that an enlargement on the end of the flexible strand will be guided by the ramp until the enlargement passes the ramp after which the inherent elasticity of the flexible strand causes the strand to pass through the slot and lock into engagement with the brake operating lever.

10. The parking brake assembly set forth in claim 9 wherein said bracket is U shaped including an intermediate portion defining said ramp.

11. The parking brake assembly set forth in claim 10 including a lip overlying said ramp for preventing inadvertent movement of the flexible strand out of engagement with the ramp.

12. The method of connecting a cable to a parking brake assembly comprising a backing plate, a pair of brake shoes pivotally mounted on the backing plate, a brake operating lever operatively connected to the brake shoe and operable by a remote cable comprising a conduit and an inner member for pivoting the brake shoes, a brake drum the lever located totally within the space between said backing plate and brake drum, which method comprises providing a guide extending from the exterior of the backing plate to the brake operating lever within the brake drum and adjacent the backing plate, providing automatic latching means on the brake operating lever, inserting the inner member of the cable through said guide so that it is guided into automatic engagement with the latching means.

13. The method set forth in claim 12 which includes the step of thereafter connecting the conduit encircling the inner member to the backing plate.

* * * * *